United States Patent Office 2,893,836
Patented July 7, 1959

2,893,836

PROCESS FOR PRODUCING SUBSTANTIALLY WHITE SODIUM BISULFATE

Walter M. Davis, Winchester, and Arthur L. Fisher, Belmont, Mass., assignors to Monsanto Chemical Company, St. Louis, Mo., a corporation of Delaware No Drawing. Application December 6, 1954
Serial No. 473,480

8 Claims. (Cl. 23—121)

This invention relates to an improved chemical process for the commercial production of a substantially white, globular sodium bisulfate.

The compound $NaHSO_4$ has been variously known as nitre or niter cake, sodium hydrosulphate, sodium acid sulfate, or sodium bisulfate. The production of sodium bisulfate is old and well known in the prior art. Historically, sodium bisulfate was long produced, as a by-product in the preparation of nitric acid, by the reaction of sulfuric acid on sodium nitrate, hence the early name nitre cake. Currently the bulk of sodium bisulfate is produced by the reaction of sulfuric acid on sodium chloride, with the simultaneous production of hydrochloric acid. The commercial sodium bisulfate so produced varies in color from a light yellow to a dark yellow and often has a residual hydrochloric acid odor. The off-color is brought about by the presence of impurities in the commercial raw materials and contamination due to corrosion and erosion of the processing equipment. Whereas the commercial sodium bisulfate can be treated to obtain a substantially pure material which has a white color, most uses do not require a chemically pure material but the trade desires a substantially white product. Accordingly, the desired substantially white sodium bisulfate must sell for approximately the same price as the colored material. Therefore it is obvious that the additional equipment, materials, labor, and overhead necessary to prepare a substantially pure product are precluded, since the material will not bear this additional expense.

It is an object of the instant invention to provide a novel modification of the commercial process for the production of sodium bisulfate whereby a substantially white product is obtained. Another object of the instant invention is to produce the aforesaid substantially white sodium bisulfate by a novel process which entails little additional capital expenditure, permitting continued sale of the improved product at no additional cost. A further object is to provide a sodium bisulfate product which is substantially free of residual hydrochloric acid odor. Other objects will be apparent to those skilled in the art in view of the following disclosure.

The sodium bisulfate is produced in the conventional manner, as for example, by the reaction of sodium chloride with sulfuric acid at an elevated temperature with the evolution of hydrogen chloride. The molten sodium bisulfate is transferred from the reaction vessel into a storage vessel wherein it is treated in accordance with the present invention.

It has now been found that the addition of from about 0.01 to about 0.5 and preferably from about 0.02 to about 0.1 percent equivalents of zinc metal in the form of an inorganic zinc compound, which forms a salt in situ in the instant process, or preferably directly in the form of a zinc salt, wherein the anion moiety of the salt is compatible and/or volatile under the conditions of the process, e.g., zinc hydroxide, zinc carbonate, zinc chloride, zinc nitrate, etc., but preferably zinc sulfate or zinc oxide, based on the sodium bisulfate, added to the molten sodium bisulfate prior to conversion from the liquid to the solid phase provides a substantially white product with little additional expense. By "compatible" is meant that the anion moiety of the zinc compound is converted to a sulfate in the process and is thereby compatible with the sulfate-bisulfate composition and by "volatile" is meant those anions which are in effect removed from the reaction mixture as volatile materials, e.g., as carbon dioxide, hydrogen chloride, oxides of nitrogen, and the like. The inorganic zinc salt can be added to the sodium bisulfate as a dry powder or in an aqueous solution when the salt is sufficiently soluble. The temperature of the molten sodium bisulfate at the time of the addition of the zinc salt is preferably from about 200 to about 225° C. and is maintained by an external heat source. The molten mass is kept under agitation to effect uniform distribution of the zinc salt and maintain a substantially uniform temperature throughout same. When the salt is added as a solution, the water should not be excessive, but a small amount of water is beneficial in repressing the conversion of a portion of the sodium bisulfate to the sodium pyrosulfate.

Thereafter the sodium bisulfate is solidified by any suitable means, as for example, cooling in molds, flowing over a chilled rotary drum to produce flakes, by projecting droplets of sodium bisulfate in a cooling air medium and providing a sufficient volume of cooling air for a given suspension time to effect solidification of the droplets before they reach the bottom of the spray chamber, etc. The production of globular sodium bisulfate is most desirable since this method provides a relatively uniform, dust-free product with a minimum of labor.

Thereafter the globular sodium bisulfate is cooled and, if desired, classified to remove any agglomerated particles and a small amount of fines, which can be reworked by returning to the storage vessel. Then the cooled, uniformly sized, globular sodium bisulfate is preferably uniformly blended with from about 0.1 to about 0.5 percent, based on the sodium bisulfate, of dry, finely powdered sodium carbonate to remove any residual hydrochloric acid odor from the product. Preferably the sodium carbonate should substantially all be in the particle size range of from about 250 to about 325 mesh (standard U.S. sieve series) since it has been found that sodium carbonate in this particle-size range seems to adhere to the sodium bisulfate particles and thereby avoids subsequent segregation in handling.

The instant invention is exemplified by the following illustrative examples:

In a continuous process refined sodium chloride and 100% sulfuric acid in a mole ratio of about 1.08 to 1.0 were introduced into a reaction vessel at a substantially uniform rate and were reacted at about 300° C. with the evolution of hydrogen chloride gas. The molten sodium bisulfate was continuously transferred to a storage vessel having a capacity of about 5 tons of sodium bisulfate, where it was held at a temperature of about 225° C. Initially sufficient solid zinc sulfate was added with agitation to provide a zinc equivalent concentration of 0.05 percent by weight of zinc, based on the sodium bisulfate. Thereafter zinc sulfate, containing 25.5 percent zinc, in the form of a 15 percent solution was metered into the molten sodium bisulfate at the rate of 3.92 pounds of solid zinc sulfate per ton of sodium bisulfate. The molten material was then solidified by projecting droplets through a cooling air medium. Thereafter the globular sodium bisulfate was further cooled and the fines and the agglomerated particles were removed such that the product consisted of solidified globules of screen size principally of from about −12 mesh to about +40 mesh with the bulk of the product having a particle size of the order of about 20 mesh. Then sodium carbonate having a particle size of from about 250 to about 325 mesh was added in sufficient amount to provide 0.2 percent by weight, based on the sodium bisulfate (4 pounds per ton of sodium bisulfate), and blended therewith. The white, globular sodium bisulfate was free from hydrochloric acid odor and was regarded as a very desirable improvement by the trade. The sodium bisulfate prepared in this manner has an available $H_2SO_4$ content of about 37 percent.

A similar run was made wherein dry, powdered zinc oxide was employed in place of the zinc sulfate and zinc sulfate solution, with substantially the same results.

The zinc salt should be retained in the molten sodium bisulfate for at least about 15 minutes prior to solidification, but longer times have not been found to effect any deleterious result. When certain salts are employed, e.g., zinc nitrate, it is necessary to provide a somewhat longer retention time of the molten product to remove the oxides of nitrogen which might otherwise color the product. Since the capacity of the heated storage vessel is normally large, the longer hold-time will not materially affect the process. However, since fresh material is constantly being added to the storage vessel in a continuous process, a small amount of freshly introduced material will always be contained in the final product. Under these conditions it may be desirable to employ a two-stage storage vessel to reduce the inclusion of material which has not been held for at least about 15 minutes.

The mole ratio of the sodium chloride to sulfuric acid can be varied as desired, e.g., to provide a product having from about 30 to about 45 percent available $H_2SO_4$, but preferably a mole ratio of sodium chloride:sulfuric acid in the range of from about 1.03:1 to about 1.15:1 is employed. On the one hand the higher mole ratio of $NaCl:H_2SO_4$ provides increasing amounts of sodium sulfate in the product and its presence materially increases the temperature necessary to maintain a satisfactory fluidity of the molten mixture, whereas on the other hand the presence of too much free sulfuric acid, ratios of $NaCl:H_2SO_4$ of less than one, precludes the formation of free-flowing globular sodium bisulfate.

It was also found that zinc, per se, in a relatively finely divided form, was effective to produce a substantially white sodium bisulfate product. However, the desired color-controlling effect appeared to be retarded until the zinc was dissolved. The slower response of zinc metal, the evolution of hydrogen with potential explosion hazard, and the deleterious odor of hydrogen sulfide in the product induced by the zinc metal treatment dictates against the formation of zinc sulfate from zinc metal in situ as a desirable substitute for the direct use of zinc sulfate.

We claim:

1. In the process of producing substantially white sodium bisulfate the step comprising the addition to molten sodium bisulfate prior to solidification of from about 0.01 to about 0.5 percent by weight of zinc, based on the sodium bisulfate, as an inorganic zinc compound selected from the group consisting of zinc oxide, zinc hydroxide, zinc sulfate, zinc carbonate, zinc chloride, and zinc nitrate, and the mixture of the zinc compound and the sodium bisulfate is maintained in the molten state for at least about 15 minutes prior to solidification.

2. The process of claim 1 wherein from about 0.02 to about 0.1 percent zinc is employed.

3. The process of claim 2 wherein the zinc compound is a dry, powdered zinc sulfate.

4. The process of claim 2 wherein the zinc compound is dry, powdered zinc oxide.

5. In the process of producing substantially odor-free, white, globular sodium bisulfate the steps comprising the reaction of sodium chloride and sulfuric acid in a mole ratio of from about 1.03:1 to about 1.15:1 at an elevated temperature; the addition of from about 0.02 to about 0.1 percent zinc, as a zinc compound selected from the group consisting of zinc sulfate, zinc oxide, zinc hydroxide, zinc carbonate, zinc chloride, zinc nitrate, and mixtures thereof, to a molten mass of sodium bisulfate at a temperature of from about 200 to about 225° C.; maintaining the mixture of the zinc compound and the sodium bisulfate in the molten state for at least about 15 minutes; projecting droplets of the molten sodium bisulfate in a cooling air medium and providing a sufficient volume of cooling air for a given suspension time to effect solidification of the droplets while air-borne; and thereafter blending from about 0.1 to about 0.5 percent of finely divided sodium carbonate with the globular sodium bisulfate; wherein all percents are by weight based on the sodium bisulfate.

6. The process of claim 5 wherein the sodium carbonate has an approximate particle size range of from about 250 to about 325 mesh.

7. In the process of producing substantially white sodium bisulfate the step comprising the addition to molten sodium bisulfate prior to solidification of from about 0.02 to about 0.1 percent by weight of zinc, based on the sodium bisulfate, as an aqueous solution of zinc sulfate, and maintaining the mixture of the zinc sulfate and sodium bisulfate in the molten state for at least about 15 minutes prior to solidification.

8. An improved substantially odor-free, white, globular composition of matter comprising sodium bisulfate containing from about 0.01 to about 0.5 percent zinc, as zinc sulfate, wherein the said zinc sulfate is distributed substantially uniformly within the globular sodium bisulfate particles as a solid solution therein, and coated with from about 0.1 to about 0.5 percent of sodium carbonate having an approximate particle-size range of from about 250 to about 325 mesh, wherein all percents are by weight based on the sodium bisulfate.

References Cited in the file of this patent

UNITED STATES PATENTS

| 732,732 | Gilman | July 7, 1903 |
| 1,312,783 | Galt | Aug. 12, 1919 |
| 1,599,996 | Fritz | Sept. 14, 1926 |
| 1,671,866 | Linville | May 29, 1928 |
| 2,117,467 | White | May 17, 1938 |

FOREIGN PATENTS

| 110,405 | Great Britain | Oct. 22, 1917 |
| 596,086 | Great Britain | Dec. 29, 1947 |